US005474654A

United States Patent [19]
Mendiratta et al.

[11] Patent Number: 5,474,654
[45] Date of Patent: * Dec. 12, 1995

[54] PROCESS FOR GAS PHASE DELIGNIFYING WOOD PULP USING CHLORINE DIOXIDE AT SUBATMOSPHERIC PRESSURE

[75] Inventors: Sudhir K. Mendiratta; David W. Cawlfield, both of Cleveland, Tenn.

[73] Assignee: Olin Corporation, Stamford, Conn.

[*] Notice: The portion of the term of this patent subsequent to Aug. 30, 2011, has been disclaimed.

[21] Appl. No.: 142,889

[22] Filed: Oct. 25, 1993

Related U.S. Application Data

[63] Continuation of Ser. No. 749,066, Aug. 23, 1991, abandoned.

[51] Int. Cl.⁶ .................................................. D21C 9/14
[52] U.S. Cl. ......................... 162/53; 162/66; 162/67
[58] Field of Search ................................ 162/53, 65, 66, 162/67, 87, 89; 423/478, 477

[56] References Cited

U.S. PATENT DOCUMENTS

| | | | |
|---|---|---|---|
| 3,579,419 | 4/1967 | Yorston et al. | 162/66 |
| 3,630,828 | 12/1971 | Liebergott | 162/67 |
| 3,655,505 | 4/1972 | Yorston et al. | 162/67 |
| 3,725,193 | 4/1973 | de Montigny | 162/17 |
| 3,810,969 | 5/1974 | Schlumberger et al. | 423/478 |
| 4,259,149 | 3/1981 | Jaszka et al. | 162/29 |
| 4,325,934 | 4/1982 | Swindells et al. | 423/479 |
| 4,798,715 | 1/1989 | Hardee et al. | 204/101 |
| 5,089,095 | 2/1992 | Cawlfield et al. | 204/101 |
| 5,342,601 | 8/1994 | Cawlfield et al. | 423/478 |

OTHER PUBLICATIONS

Rudra Signh, "The Bleaching of Pulp", TAPPI Press, 2nd Edition, 1979, p. 63.
Jiri Basta et al., "Low AOX, Possibilities & Consequences", 1989 Pulping Conference, Book 2, Oct. 1989, TAPPI Press.
Cook, Roger., "A bleaching Proc for Min. AOX discharges," Cook of Apita, vol. 44, No. 3, May 1991, pp. 179–183.
Perkins, "Gas Phase Bleaching", CEP Jun. 1976 pp. 51–54.
Stockburger, Paul. "What You need to know before buying your next ClO₂ plant", TAPPI, vol. 76, No. 3, Mar. 1993, pp. 99–104.
Reeve, D. W., Weishar, K. M., and Li, L.; "Process Modifications to Decrease Organochlorine Formation During Chlorine Dioxide Delignification" presented at International Pulp Bleaching Conference, Vancouver, B.C., Jun. 13–16, 1994.
L. Torregrossa et al. "Decomposition of Gaseous Chlorine Dioxide" TAPPI, vol. 59, No. 11, Nov. 1976, pp. 92–93.
H. deV. Partridge et al., "Two Years of SVP Chlorine Dioxide Plant Operations" Pulp & Paper Magazine of Canada, vol. 73, #8, Aug. 1992.

*Primary Examiner*—David L. Lacey
*Assistant Examiner*—Dean T. Nguyen
*Attorney, Agent, or Firm*—William A. Simons

[57] ABSTRACT

A process for gas phase delignifying wood pulp comprising: contacting wood pulp in the first stage of pulp bleaching with chlorine dioxide-containing gas to delignify said wood pulp; wherein
(a) said wood pulp has a consistency of at least about 15 percent;
(b) said chlorine dioxide-containing gas contains less than about 3% by weight chlorine gas, based on the weight of chlorine dioxide in said gas; and
(c) said contacting is conducted at a subatmospheric pressure from about 15 to about 750 mm Hg. This process reduces the formation of chloroform and significantly reduces the amounts of toxic by-products such as dioxin and other organic chlorides. These undesirable by-products, collectively identified as absorbable organic halides (AOX), require effluents from pulp bleaching processes to undergo expensive treatment methods to eliminate AOX's prior to discharges to sewers. The effluent discharge from this process generally has less than 2.0 kg adsorbed organic halides (AOX) per ton of wood pulp. The pulp produced by this process has a brightness and viscosity that meet or exceed the requirements of industrial papermaking.

34 Claims, No Drawings

PROCESS FOR GAS PHASE DELIGNIFYING WOOD PULP USING CHLORINE DIOXIDE AT SUBATMOSPHERIC PRESSURE

This application is a continuation of application Ser. No. 07/749,066, filed Aug. 23, 1991 now abandoned.

BACKGROUND OF THE INVENTION

The present invention relates to an improved delignifying method for wood pulp and more specifically to an improved method for gas phase delignifying wood pulp using chlorine dioxide.

Chlorine dioxide has found wide use as a disinfectant in water treatment/purification, as a bleaching agent in pulp and paper production, and a number of other uses because of its high oxidizing power. There are a number of chlorine dioxide generator systems and processes available in the marketplace. Most of the very large scale generators utilize a chlorate salt, a chloride ion source or reducing agent, and a strong acid. In the presence of chloride ion and acid, chlorate ion reacts to produce a mixture of chlorine and chlorine dioxide. The chlorine present is an undesired by-product.

Many processes have been developed to produce chlorine dioxide with lower chlorine concentrations by adding a reducing agent.

Reducing agents which have been used include methanol or other organic compounds, sulfur, sulfur dioxide or other sulfur-oxygen species having a sulfur valence of less than +6, and carbon monoxide among others. When organic compounds are used, unreacted volatile organics including organic acids are present in the product gas. Using sulfur containing reducing agents, the sulfate or sulfuric acid produced accumulates as a waste product. When gaseous reducing agents such as sulfur dioxide or carbon monoxide are employed, reactor designs and process control systems must protect against unreacted reducing agent leaving the system with the chlorine dioxide gas.

In addition, prior art processes for the production of chlorine dioxide from chlorate salts require an excess of the acid used. This acid is slowly neutralized by the accumulation of alkali metal ions that enter the process with the chlorate salt. The accumulation of salts must be removed as a waste stream, either liquid or solid, in every process currently practiced commercially.

To avoid the formation of an acidic alkali metal salt, it has been proposed that chlorine dioxide be prepared from chloric acid. Chloric acid is, however, not commercially available. Its preparation has been taught, for example, in U.S. Pat. No. 3,810,969 issued May 14, 1974 to A. A. Schlumberger. Schlumberger teaches a process for producing chloric acid by passing an aqueous solution containing from 0.2 gram mole to 11 gram moles per liter of an alkali metal chlorate such as sodium chlorate through a selected cationic exchange resin at a temperature from 5° to 40° C. The process produces an aqueous solution containing from 0.2 gram mole to about 4.0 gram moles of $HClO_3$ per liter.

K. L. Hardee et al, in U.S. Pat. No. 4,798,715 issued Jan. 17, 1989, describe a process for chlorine dioxide which electrolyzes a chloric acid solution produced by passing an aqueous solution of an alkali metal chlorate through an ion exchange resin. The electrolysis is carried out using an electrocatalytic cathode where the catalyst is, for example, one or more valve metal oxides which may be combined with a platinum group metal oxide, or a platinum group metal, or oxides of a platinum group metal, magnetite, ferrite, or mixed metal oxides.

The electrolyzed solution contains a mixture of chlorine dioxide, and chloric acid which is fed to an extractor in which the chlorine dioxide is stripped off. The ion exchange resin is regenerated with hydrochloric acid and an acidic solution of an alkali metal chloride formed.

Processes which produce chloric acid in an ion exchange resin require the regeneration of the ion exchange resin with acid to remove the alkali metal ions and the use or treatment and disposal of the acidic salt solution. In addition, the concentration of chloric acid which can be produced by an ion exchange process is limited as more concentrated chloric acid solutions attack the ion exchange resins used in the process. Further, the production of chloric acid by means of a cation exchange resin has not been economically attractive.

Gas phase bleaching with chlorine dioxide has been proposed over the years in various patents and publications as a method of reducing the bleaching time while cutting chemical costs. Gas phase bleaching is carried out on higher consistency pulp using mixtures of chlorine dioxide and steam and/or inert gases such as air or nitrogen.

U.S. Pat. No. 3,725,193, issued Apr. 3, 1973 to R. M. DeMontigny et al., describes a process for bleaching high consistency pulps, which includes preheating the pulp by direct steaming. A gaseous mixture of chlorine dioxide diluted with steam or a non-reactive gas is then passed through the pulp. The contact period is in the order of a fraction of a second. The bleached pulp was then held in a retention vessel for 30 minutes. Unreacted chlorine dioxide was removed from a bleaching tower by aeration. The final pH of the bleached pulp was 5.2.

Advantages alleged for gas phase bleaching of high consistency wood pulps include superior control of bleaching because of the short retention times employed; reduced chemical usage for the same brightness; and low water usage and effluent volume among others. Progress in achieving these advantages for gas phase bleaching commercially have been thwarted by the lack of a process for generating chlorine dioxide gas instantaneously, that is, a process having inconsequential start-up times and shut-down times so that the chlorine dioxide gas can be used directly from the generator without requiring the formation and storage of dilute aqueous solutions of chlorine dioxide which are subsequently stripped. In addition, previous processes for bleaching with chlorine dioxide gas have used chlorine dioxide having significant concentrations of chlorine gas which result in undesired damage to the cellulose.

SUMMARY OF THE INVENTION

Now it has been found that wood pulp can be delignified in a gas phase process using chlorine dioxide which can be produced instantaneously in commercial concentrations and having only traces of chlorine. The process of the invention delignifies wood pulp in very short treatment times without requiring additional retention time. After delignification there is substantially no residual chlorine dioxide requiring recovery or disposal. Further, storage of $ClO_2$ gas or formation of solutions of chlorine dioxide is not necessary and the process can be operated economically and efficiently.

These and other advantages are accomplished in a process for delignifying wood pulp which comprises contacting the wood pulp with chlorine dioxide gas containing less than about 3 percent by weight of chlorine to delignify the wood

DETAILED DESCRIPTION OF THE INVENTION

Suitable pulps which can be bleached include any of those which are commonly used such as chemical kraft, sulfite or mechanical and recycle pulps. Pulp having any suitable consistencies may be delignified including those of about 15 percent or higher, for example, from about 25 to about 50 percent can be treated by the process of the present invention. The pulps are preferably shredded or fluffed.

Chlorine dioxide gas used as a reactant in the process of the present invention contains low concentrations of chlorine and preferably small amounts of inert gases such as nitrogen or air. Suitably the chlorine dioxide gas used in delignification of pulp is a mixture of chlorine dioxide, gaseous oxygen, and water vapor. Concentrations of chlorine dioxide present include those in the range of from about 0.5 to about 10, and, preferably from about 1 to about 6 percent by volume. The chlorine dioxide gas is substantially free of chlorine, having less than about 3 percent by weight, preferably less than about 2 percent by weight, and more preferably less than about 1.5 percent by weight based on the weight of chlorine dioxide in the gas. The gaseous mixture contains varying concentrations of oxygen and water vapor. The amount of oxygen can be independently varied to provide molar ratios of $O_2$ to $ClO_2$ by volume of from about 1:4 to about 50:1. Water vapor or steam is preferably the primary diluent in the gaseous mixture and replaces other inert gases which are normally used. As a diluent steam supplies heat to the pulp and minimizes cooling by evaporation which occurs with, for example, air as the diluent.

Gaseous mixtures containing chlorine dioxide suitable for use in the novel process of the present invention can be produced from concentrated solutions of chloric acid. Conversion of the chloric acid to chlorine dioxide can be accomplished, for example, by cathodic reduction in an electrolytic cell or by contacting the chloric acid with a suitable catalyst in the presence of heat. In an alternate process, highly acidic aqueous solutions containing chlorate ions, including chloric acid, perchlorate ions and hydrogen ions are reacted to produce a gaseous mixture of chlorine dioxide, oxygen and water vapor (steam). The gaseous mixture has low concentrations of inert gases such as air or nitrogen and yet provides reduced risks to spontaneous explosions or "puffs". The aqueous solutions have a hydrogen ion concentration of at least 2 molar and preferably at least 3 molar, a concentration of chlorate ions of at least 0.02 molar and preferably from about 0.1 to about 3 molar, and concentrations of perchlorate ions which provide a molar ratio of perchlorate ions to chlorate ions of from about 0.5:1 to about 100:1, and preferably from about 3:1 to about 20:1. These acidic solutions preferably are substantially free of ionic impurities such as chloride ions, alkali metal and alkaline earth metal ions.

The hydrogen ion concentration in the aqueous solutions may be provided by non-oxidizable inorganic acids such as sulfuric acid, phosphoric acid or perchloric acid. Preferably, the acidic solutions are reacted in the presence of a catalyst which promotes oxygen evolution.

Suitable as oxygen-evolving catalysts are, for example, metals and oxides of the elements of Group VIIIA of the Periodic Table of Elements. Thus metals such as the platinum group metals including platinum, palladium, iridium, rhodium or ruthenium; and mixtures or alloys of these platinum group metals may be employed. Additionally oxides of platinum group metals such as iridium, rhodium or ruthenium, as well as mixtures of these oxides with platinum group metals or alloys of these precious metals could be suitably employed. Likewise, iron alloys such as stainless steel, nickel or nickel based alloys, and cobalt based alloys can be used as oxygen-evolving catalysts in the process of the invention. Other oxygen-evolving catalysts include semiconductive ceramics known as perovskites. To suppress or minimize the auto-oxidation of chloric acid to perchloric acid for example, where an oxygen-evolving catalyst is employed, it is preferred to use, as the source of chlorate ions, a mixture of chloric acid and a non-oxidizable inorganic acid in which the concentration of chloric acid is low, for example, less than about 20 percent by weight of the aqueous solution providing chlorate ions. These processes for generating chlorine dioxide can be started up in a few minutes and similarly stopped in a short time so that storage of $ClO_2$ gas or dissolution in water or a solvent is not required.

High purity concentrated chloric acid solutions are produced by the oxidation of high purity hypochlorous acid solutions. One process suitable for producing the chloric acid solutions heats a hypochlorous acid solution, containing from about 35 to about 60 percent by weight of HOCl, at a temperature in the range of from about 25 to about 120° C. Another process for producing the high purity chloric acid solution utilizes anodic oxidation of the high purity concentrated hypochlorous acid solution in an electrolytic cell having an anode compartment, a cathode compartment, and an cation exchange membrane separating the anode compartment from the cathode compartment.

In operation, the process includes feeding an aqueous solution of hypochlorous acid to the anode compartment, and electrolyzing the aqueous solution of hypochlorous solution at a temperature of from about 0° to about 40° C. to produce the chloric acid solution.

Chloric acid solutions can be produced by these processes in any concentrations desired up to about 45% by weight of $HClO_3$. However, preferred concentrations are those in the range of from about 30 to about 40% by weight of $HClO_3$.

Generation of the chlorine dioxide gas from the reaction mixture containing chloric acid and the non-oxidizable inorganic acid is preferably conducted at subatmospheric pressures, for example, pressures in the range of from about 15 to about 750, preferably at from about 100 to about 500, and more preferably at from about 150 to about 300 mm of Hg. At these pressures the temperature of the reaction mixture is in the range of from about 40° to about 90° C., and preferably at from about 50° to about 80° C. The temperatures and pressures are selected to maintain continuous boiling of the reaction mixture.

The novel delignification process of the present invention may use but does not require apparatus such as a chlorination or bleaching tower. Delignification of pulp may be affected in the initial stage of a multi-stage bleaching process, as well as in any "D" stage, for example, in the third stage for both kraft and sulfite pulps, as well as in the fifth stage for kraft pulps. The initial delignification step of unbleached pulp is carried out in any suitable equipment in which the unbleached pulp can be contacted with the chlorine dioxide gas. For practical reasons any reactor should be gas tight. Suitable gas tight equipment includes, for example, agitated mixers, static mixers, ribbon blenders, steam chests, high consistency shear mixers, MC pumps, MC mixers, high velocity pipe lines, and the like.

The chlorine-free ClO$_2$ is admixed with the pulp in a reactor which is at any suitable pressure including atmospheric, subatmospheric or superatmospheric pressures. In a preferred embodiment the reactor is at subatmospheric pressures which are preferably slightly below those employed in the chlorine dioxide generator. Optionally at superatmospheric pressures an eductor can be used which employs high pressure air, steam or inert gases to remove chlorine dioxide from the generator and supply it to the pulp reactor. Chlorine dioxide gas is used in amounts which provide a concentration suitable for delignifying the unbleached chemical pulp to the desired degree, as indicated, for example, by the selected Kappa number as determined by industry accepted procedures. Suitable amounts include, for example, depending on the type of pulp, those which provide a % of ClO$_2$ for dry pulp determined by multiplying the Kappa no xs 0.057 xs the efficiency factor which is in the range of from about 0.5 to about 2.

The delignification of the pulp using the process of the invention slurry is accomplished in surprisingly short contact times with the delignification rate being independent of pulp temperatures. The temperature of the delignification reaction is not critical and delignification can be carried out at surprisingly low temperatures including ambient temperatures. Temperatures in the range of from about 40° to about 90° C., and more preferably, from about 50° C. to about 80° C. At these temperatures substantially no exposure time is required.

To maximize the efficiency of chlorine dioxide use, delignification of the pulp is carried out under acidic conditions. For example, in any delignification stage following a caustic extraction stage, the pH of the pulp is adjusted so that the final pH of the delignified pulp is in the range of from about 1 to about 6.

An extraction stage (E) is then carried out with, for example, caustic soda to solubilize the higher molecular weight oxidized lignins, to hydrolyze organic chlorides to salts, etc.

The extraction is conducted at temperatures of 60°–90° C., and a residence time of about 60 minutes where the final pH is 10.5 or higher. The extraction stage may include the addition of oxygen, a peroxide such as hydrogen peroxide, or hypochlorite for enhanced performance. The extracted pulp is filtered and washed to remove water soluble lignins and low molecular weight organic chlorides, among others.

After the initial delignification and extraction using the process of the present invention, the delignified chemical pulp has a Kappa number in the range of from about 0.1 to about 10 and preferably from about 1 to about 5. Following extraction, the viscosity of the treated pulp remains high i.e. above about 20, indicating minimal degradation to the pulp.

The extracted pulp may be subsequently further delignified, for example, using the process of the invention or any known bleaching stage to achieve the final brightness desired.

It has been discovered that the novel process of the present invention reduces the formation of toxic by-products organic halides. These undesirable by-products, collectively identified as adsorbable organic halides (AOX), require effluents from pulp bleaching processes to undergo expensive treatment methods to eliminate AOX prior to discharge to sewers. The effluent discharge from the bleaching process of the present invention has less than 2.0 kg adsorbed organic halides (AOX) per ton of wood pulp. AOX, as the term is used herein refers to the sum of the AOX, i.e. adsorbed organic halides, of the several stages of bleaching.

The pulp produced by the present invention has a brightness and viscosity that meet or exceed the requirements of industrial papermaking.

To further illustrate the invention the following examples are provided without any intention of being limited thereby. All parts and percentages are by weight unless otherwise specified and temperatures are in degrees Celsius. In all examples the pressure in the generator was maintained in the range of 100 to 300 mm Hg.

EXAMPLE 1

First Stage Bleaching

To a jacketed reaction vessel containing a gas distribution plate and a thermometer, was added 125 grams of oven dried fluffed softwood pulp having a consistency of 35%. The initial Kappa No. of the softwood pulp was 24.6 and the viscosity 27.8 cps. The temperature of the pulp was maintained at about 63° C. by circulating hot water through the jacket. The pulp reaction vessel was connected to two gas scrubbers, each of which contained a 10% solution of potassium iodide. The chlorine dioxide generator was initially filled with 1000 grams of perchloric acid containing 40 percent by weight of HClO$_4$, admixed with the perchloric acid was 10 grams of ruthenium dioxide, RuO$_2$. A gaseous mixture of chlorine dioxide, oxygen and water vapor was generated by feeding a chloric acid solution containing 35 percent by weight of HClO$_3$. During chlorine dioxide generation, the generator was maintained at a temperature of 72° C. by regulating the feed rate of the chloric acid, providing sufficient heat of reaction to evaporate the water present in the chloric acid solution and that formed during the generation of chlorine dioxide. The softwood pulp was treated for 1 minute and 32 seconds, during which time 1.83% of chlorine dioxide was added to the pulp. The delignified pulp was filtered and washed and the filtrate, having a pH of 2.1, and the wash water collected. Extraction of the delignified pulp was carried out by adding 3.75 g. of NaOH and water in an amount which reduced the consistency to 11%. The pulp was held at 70° C. for 60 minutes. The extracted pulp was dried, washed and the Kappa number determined and the viscosity of the pulp measured. The absorbable organic halides (AOX) in the combined solution mixture of the bleach filtrate, wash water, extraction liquor and wash water was determined. The results are summarized in Table I below.

EXAMPLES 2–7

Unfluffed softwood pulp (125 grams) was treated by the delignification and extraction processes employed in Example 1 in which one or more of the following were varied: pulp consistency, pulp temperature, reactor temperature, exposure time and ClO$_2$ concentration. The results are listed in Table I below.

TABLE I

First Stage Bleaching
Softwood Pulp - 24.6 KAPPA NO. & 27.8 cps Viscosity

| Example No. | 1 | 2 | 3 | 4 | 5 | 6 | 7 |
|---|---|---|---|---|---|---|---|
| Consistency % | 35 | 35 | 35 | 35 | 50 | 20 | 20 |
| Fluffed/Unfluffed | F | F | F | UF | F | UF | UF |
| Reactor Temp. °C. | 72 | 58 | 70 | 60 | 67 | 70 | 65 |
| Pulp Temp. °C. | 63 | 58 | 51 | 69 | 66 | 70 | 49 |
| Time, Min. Sec. | 1:32 | 40:0 | 1:35 | 25:0 | 35:30 | 21:0 | 7:17 |

TABLE I-continued

First Stage Bleaching
Softwood Pulp - 24.6 KAPPA NO. & 27.8 cps Viscosity

| Example No. | 1 | 2 | 3 | 4 | 5 | 6 | 7 |
|---|---|---|---|---|---|---|---|
| ClO$_2$ Consumed % | 1.83 | 2.27 | 2.68 | 0.95 | N.D. | N.D. | 0.93 |
| Filtrate pH | 2.1 | 3.1 | 3.3 | 3.0 | 2.9 | 2.1 | 3.4 |
| Extraction K No. | 4.1 | 3.1 | 4.2 | 3.1 | 3.0. | 2.5 | 6.8 |
| Viscosity, cps. | 20.6 | 20.9 | 23.6 | 21.1 | 16.7 | 21.1 | 23.7 |
| AOX* Kg/M.Ton | | | | | | | |
| 1st Stage Filtrate | 0.50 | 0.88 | 0.63 | 0.86 | 0.98 | 0.90 | 0.45 |
| Extraction Filtrate | 0.47 | 0.66 | 0.42 | 0.77 | 0.72 | 0.45 | 0.25 |
| Total: | 0.97 | 1.54 | 1.05 | 1.63 | 1.70 | 1.35 | 0.70 |

AOX* = Absorbable Organic Halides

EXAMPLE 8

Unfluffed hardwood pulp (125 grams), having an initial Kappa No. of 15.1, and viscosity of 32.8 cps was added to the reaction vessel. The pulp reaction vessel was connected to two gas scrubbers, each of which contained a 10% solution of potassium iodide. The chlorine dioxide generator was operated at a temperature of 66° C. The hardwood pulp, at a temperature of approximately 58° C., was exposed to chlorine dioxide for 3 minutes, during which time 1.83% of chlorine dioxide was added to the pulp. The delignified pulp was filtered and washed and the filtrate, having a pH of 3.7, and the wash water collected. Extraction of the delignified pulp was carried out by adding 3.75 g. of NaOH and water in an amount which reduced the consistency to 11%. The pulp was held at 70° C. for 60 minutes. The extracted pulp was dried, washed and the Kappa number determined and the viscosity of the pulp measured. The total organic halides (AOX) in the combined solution mixture of the bleach filtrate, wash water, extraction liquor and wash water was determined. The results are summarized in Table II below.

EXAMPLES 9–13

Unfluffed hardwood pulp (125 grams) was treated by the delignification and extraction processes employed in Example 1 in which one or more of the following were varied: pulp consistency, pulp temperature, reactor temperature, exposure time and ClO$_2$ concentration. The results are listed in Table II below.

TABLE II

First Stage Bleaching
Hardwood Pulp - 15.1 KAPPA NO. & 32.8 cps Viscosity

| Example No. | 10 | 11 | 12 | 13 | 14 |
|---|---|---|---|---|---|
| Consistency % | 35 | 35 | 35 | 20 | 50 |
| Fluffed/Unfluffed | UF | F | UF | UF | UF |
| Reactor Temp. °C. | 65 | 65 | 65 | 68 | 65 |
| Pulp Temp. °C. | 58 | 65 | 25.55 | 65 | 63 |
| Time, Min. Sec. | 3:0 | 12:00 | 11:0 | 42:0 | 5:30 |
| ClO$_2$ Consumed % | 1.36 | 2.31 | 0.40 | N.D. | 2.03 |
| Filtrate pH | 3.7 | 3.3 | 3.1 | 2.8 | 3.1 |
| Extraction K No. | 2.4 | 2.2 | 1.8 | 1.2. | 1.9 |
| Viscosity, cps. | 31.3 | 28.2 | 30.2 | 24.6 | 25.1 |
| AOX* Kg/M. Ton | | | | | |
| 1st Stage Filtrate | 1.06 | 1.23 | 1.06 | 0.95 | 1.13 |
| Extraction Filtrate | 0.13 | 0.16 | 0.15 | 0.14 | 0.16 |
| Total: | 1.19 | 1.39 | 1.21 | 1.09 | 1.29 |

AOX* = Absorbable Organic Halides

EXAMPLE 14

Third Stage Bleaching

Softwood pulp which had been delignified by the process of the invention was extracted using the procedure of Example 1. After extraction, the extracted pulp was fluffed and the fluffed pulp, at a temperature of 65° C., placed in the reaction vessel. Chlorine dioxide was passed through the pulp for 60 minutes. The delignified pulp was washed and the viscosity of the pulp measured. A hand sheet of the pulp was made and the brightness of the sheet measured 81.5. The handsheet was placed in an oven at 105° C. for 1 hour after which the brightness of the sheet measured 76.9.

EXAMPLE 15

Hardwood pulp which had been delignified by the process of the invention was extracted using the procedure of Example 1. After extraction, the extracted pulp was fluffed and the fluffed pulp, at a temperature of 60° C., placed in the reaction vessel. The hardwood pulp was treated for 15 minutes during which time 0.58% of chlorine dioxide was added to the pulp. Chlorine dioxide was passed through the pulp for 60 minutes. The delignified pulp was washed and the viscosity of the pulp measured. A hand sheet of the pulp was made and the brightness of the sheet measured 80.3. The handsheet was placed in an oven at 105° C. for 1 hour after which the brightness of the sheet measured 77.0. The absorbable organic halides (AOX) in the combined solution mixture of the bleach filtrate, wash water, extraction liquor and wash water was determined. The results are summarized in Table III below.

TABLE III

Third Stage Bleaching (DED)

| Example No. | Softwood 14 | Hardwood Pulp 15 |
|---|---|---|
| Consistency % | 34 | 33 |
| Fluffed/Unfluffed | UF | F |
| Reactor Temp. °C. | 65 | 69 |
| Pulp Temp. °C. | 65 | 60 |
| Time, Min. Sec. | 60:0 | 15:0 |
| ClO$_2$ Consumed % | N.D. | 0.58 |
| Filtrate pH | 3.0 | 3.6 |
| Viscosity, cps. | 13.0 | 28.2 |
| Brightness | 81.2 | 80.3 |
| Reverted Brightness | | |
| 1 hr @ 105° F. | 76.9 | 77.0 |
| AOX* Kg/M.Ton | N.D. | 0.10 |

AOX* = Absorbable Organic Halides

EXAMPLE 16

To a chlorine dioxide generator was connected a vacuum gauge, a thermometer, and an eductor providing vacuum. The eductor was operated using 30 kgs of a solution containing 3.33% KI pumped from a tank to which the effluent from the eductor was returned. The generator was charged with 1142 grams of HClO$_4$ (70%), 858 grams of deionized water and 9.991 grams RuO$_2$. To the generator was added 1500 ccs. of 36.2% HClO$_3$ (0% HClO$_4$, wt. 3908 grams). After applying vacuum to the reactor, the temperature was approximately 57 degrees C. and the pressure was approximately 79 millimeters of mercury vacuum. Within 3 minutes the solution turned yellow indicating generation of ClO$_2$. After 10 minutes of gas absorption, the KI solution was analyzed and found to contain 81.35 milliequivalents of chlorine dioxide and 0.856 milliequivalents of chlorine.

What is claimed is:

1. A process for gas phase delignifying wood pulp comprising:

contacting wood pulp in a first stage of pulp bleaching process with chlorine dioxide-containing gas to delignify said wood pulp; wherein
   (a) said wood pulp has a consistency of at least about 15 percent;
   (b) said chlorine dioxide-containing gas contains less than about 3% by weight chlorine gas, based on the weight of chlorine dioxide in said gas; and
   (c) said contacting is conducted at a subatmospheric pressure from about 100 to about 500 mm Hg.

2. The process of claim 1 wherein said pulp consistency is from about 25 to about 50 percent.

3. The process of claim 1 wherein said chlorine dioxide-containing gas consists essentially of chlorine dioxide, gaseous oxygen and water vapor and the concentration of chlorine dioxide in said gas is from about 0.5 to about 10 percent by volume.

4. The process of claim 3 wherein said concentration of chlorine dioxide in said gas is from about 1 to about 6 percent by volume.

5. The process of claim 3 wherein the molar ratio of $O_2$ to $ClO_2$ in said gas is from about 1:4 to about 50:1.

6. The process of claim 1 wherein said gas contains less than about 1.5 percent by weight chlorine, based on the weight of chlorine dioxide in said gas.

7. The process of claim 1 wherein said subatmospheric pressure is from about 150 to about 300 mm Hg.

8. The process of claim 1 wherein said delignification is carried out at a temperature from about 40° C. to about 90° C.

9. An integrated chlorine dioxide generation and gas phase delignification of wood pulp process comprising the steps of:

(1) reacting an aqueous solution of chloric acid containing about 30 percent or greater by weight of $HClO_3$, with a non-oxidizable inorganic acid, in the presence of an oxygen evolving catalyst selected from Group VIII A of the Periodic Table of Elements in a reactor to produce a chlorine dioxide-containing gas containing less than about 3 percent by weight of chlorine, based on the weight of chlorine dioxide in said gas; and (2) contacting wood pulp in a first stage of pulp bleaching process with said chlorine dioxide-containing gas to delignify said wood pulp; wherein
   (a) said wood pulp has a consistency of at least about 15 percent; and
   (b) said contacting is conducted at a subatmospheric pressure from about 100 to about 500 mm Hg.

10. The process of claim 9 wherein said non-oxidizable inorganic acid is selected from the group consisting of sulfuric acid, phosphoric acid, perchloric acid and mixtures thereof.

11. The process of claim 9 wherein said non-oxidizable inorganic acid is perchloric acid.

12. The process of claim 9 wherein said aqueous solution of chloric acid is produced by oxidizing an aqueous solution of hypochlorous acid that is substantially free of ionic impurities.

13. The process of claim 9 wherein said oxygen-evolving catalyst is a platinum group metal, a platinum group metal oxide or mixtures thereof.

14. The process of claim 9 wherein said oxygen-evolving catalyst is selected from the group consisting of an oxide of iridium, rhodium or ruthenium.

15. The process of claim 9 wherein said step (1) is carried out at a subatmospheric pressure in the range from about 15 to about 750 mm Hg.

16. The process of claim 9 wherein said steps (1) and (2) are carried out at a reaction temperature of about 40° C. to about 90° C.

17. An integrated chlorine dioxide generation and gas phase delignification of wood pulp process comprising the steps of:

(1) reacting chlorate ions, perchlorate ions and hydrogen ions in an aqueous solution substantially free of ionic impurities in the presence of an oxygen-evolving catalyst selected from Group VIII A of the Periodic Table of Elements in a reactor at a subatmospheric pressure from about 15 to 750 mm Hg and a reaction temperature of about 40° C. to about 90° C. said molar ratio of perchlorate ions to chlorate ions is at least about 0.5:1, to produce a chlorine dioxide-containing gas comprising chlorine dioxide, oxygen and water vapor, said gas containing less than 3 percent by weight of chlorine, based on the weight of chlorine dioxide in said gas; and (2) directly contacting wood pulp in a first stage of pulp bleaching process with said chlorine dioxide-containing gas to delignify said wood pulp; wherein
   (a) said wood pulp has a consistency of at least about 15 percent; and
   (b) said contacting is conducted at a subatmospheric pressure from about 100 to about 500 mm Hg.

18. The process of claim 17 wherein the source of chlorate ions is chloric acid.

19. The process of claim 18 wherein the source of perchlorate ions is perchloric acid.

20. The process of claim 19 wherein the concentration of hydrogen ion is at least 2 molar.

21. The process of claim 20 wherein the concentration of chlorate ions is at least 0.02 molar.

22. The process of claim 21 wherein the molar ratio of perchlorate ions to chlorate ions is from about 3:1 to about 20:1.

23. The process of claim 22 wherein said oxygen-evolving catalyst is an oxide of iridium, rhomium or ruthenium.

24. The process of claim 22 wherein said subatmospheric pressure in step (1) is from about 100 to about 500 mm Hg.

25. The process of claim 24 wherein said subatmospheric pressure in steps (1) and (2) is from about 150 to about 300 mm of Hg.

26. The process of claim 24 wherein the concentration of said chlorine dioxide in said gas is from about 0.5 to about 10 percent by volume.

27. The process of claim 26 wherein the molar ratio of $O_2$ to $ClO_2$ in said gas is from about 1:4 to about 50:1.

28. The process of claim 27 wherein said gas contains less than about 1.5 percent by weight chlorine, based on the weight of chlorine dioxide in said gas.

29. The process of claim 28 wherein said pulp consistency is from about 25 to about 50 percent.

30. The process of claim 29 wherein the reaction temperature of step (2) is about 40° C. to about 90° C.

31. A process for gas phase delignifying wood pulp comprising the steps:

(1) contacting wood pulp in a first stage of pulp bleaching process with chlorine dioxide-containing gas to delignify said wood pulp; wherein
   (a) said wood pulp has a consistency of at least about 15 percent,
   (b) said chlorine dioxide-containing gas contains less than about 3% by weight chlorine gas, based on the weight of chlorine dioxide in said gas; and (c) said contacting is conducted at a subatmospheric pressure from about 100 to about 500 mm Hg;

(2) extracting the delignified pulp with an alkaline solution as the second stage; and (3) separating said delignified pulp from an effluent that contains less than 2.0 kg. absorbed organic halides (AOX) per ton of wood pulp.

32. The process of claim 31 wherein said extraction is conducted at a temperature of about 60° to about 90° C.

33. An integrated process for chlorine dioxide generation and gas phase delignifying wood pulp comprising the steps of:

(1) producing chlorine dioxide-containing gas from chloric acid, said chlorine dioxide-containing gas containing less than 3% by weight chlorine, based on the weight of chlorine dioxide in said gas; and (2) directly contacting wood pulp with said chlorine dioxide-containing gas to delignify said wood pulp; wherein (a) said wood pulp has a consistency of at least about 15 percent; and (b) said contacting is conducted at a sub-atmospheric pressure from about 100 to about 500 mm Hg.

34. The process of claim 33 additionally involving (3) extracting the delignified pulp with an alkaline solution; and (4) separating said delignified pulp from an effluent that contains less than 2.0 kg. absorbed organic halides (AOX) per ton of wood pulp.

\* \* \* \* \*